Figure 1:
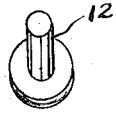

Dec. 27, 1966   A. S. DALTON ET AL   3,293,977

LIQUID ENCAPSULATED FASTENER DEVICE

Filed Oct. 30, 1964

INVENTORS
A. STANLEY DALTON
ALBERT OLEVITCH
BY Harry A. Herbert Jr
and Louis E. Hay
ATTORNEYS

3,293,977
LIQUID ENCAPSULATED FASTENER DEVICE
A. Stanley Dalton, Bellbrook, and Albert Olevitch, Dayton, Ohio, assignors to the United States of America as represented by the Secretary of the Air Force
Filed Oct. 30, 1964, Ser. No. 407,938
1 Claim. (Cl. 85—37)

The invention described herein may be manufactured and used by or for the United States Government for governmental purposes without payment to us of any royalty thereon.

This invention relates to fastening devices used to join structural members, and more specifically to fastening devices used to permanently join so-called sheet metal elements to each other or to thicker structures on aircraft, riveted vessels, boats and the like. While not limited to such use, and for purposes of illustration, the invention to be disclosed will be discussed as applied to sheet metal structures such as found on airplanes.

The entire airplane envelope is for the most part made into a unitary structure by permanently riveting a plurality of individual pieces to adjacent pieces. Structures formed in this manner have at least two inherent problems which require protective measures: (1) galvanic action between adjacent elements, and (2) moisture creeping into joints produces corrosion and weakens the joints.

Up to the present time, one of the most highly regarded procedures of aircraft corrosion control was to seal all exterior fasteners with fluid zinc chromate primer or with fluid (uncured) polysulfide sealant. Whenever this practice is followed, the corrosion around fasteners (usually of the not easily detected exfoliation type) has been reduced to a great extent. This process currently requires the installation of the wet fasteners by hand since the fluid coating material, in which the fasteners have been dipped, will transfer to and clog the mechanism of automatic riveting machines. Since the rivets must be installed by hand, production is slower and at greatly increased labor costs. All attempts to develop a method by which dipped rivets may be installed by automatic riveting machines have met with failure.

This invention, as will be seen, discloses fasteners which are coated with fluid sealants and yet are capable of being installed by automatic riveting machines.

One object of this invention is to provide fasteners which are coated with a fluid sealant while presenting a dry external surface.

Another object of this invention is to provide rivets carrying a fluid sealant, yet being capable of installation with automatic riveting machines.

A further object of this invention is to provide fasteners carrying encapsulated fluid sealant which is released to provide a protective coating when the rivet is installed.

Yet another object of this invention is to provide fasteners carrying fluid sealant which may be stocked as shelf items and require no intermediate steps before installation in the manner of conventional fasteners.

A still further object of this invention is to provide a rivet carrying encapsulated fluid sealant to thereby eliminate the necessity for predipping before such rivet is installed.

An additional object of this invention is to provide a rivet which will speed up production and effect labor savings in the construction and modification of air frames.

Another object of this invention is to disclose methods by which fasteners having the above stated objects may be produced.

Figure 2:
Figure 3:
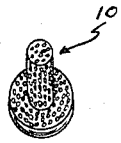
Figure 4:
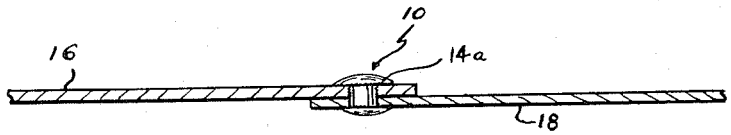

Additional objects, advantages and features of the invention reside in the construction, arrangement and combination of parts involved in the embodiment of the invention as will appear from the following description and accompanying drawings wherein, FIG. 1 is a perspective of a typical conventional rivet,
FIG. 2 illustrates a plurality of capsules or pellets filled with liquid sealant,
FIG. 3 is a perspective of the rivet shown on FIG. 1 with the encapsulated liquid sealant shown on FIG. 2 joined thereto, and
FIG. 4 is an illustration showing the rivet of FIG. 3 joining two typical sheet metal elements, and further showing the released sealant providing a protective coating.

Referring to the drawing, one embodiment of this invention, as shown by FIG. 3, and referred to as encapsulated rivet 10, may be made from a conventional rivet 12 such as shown by FIG. 1, and a plurality of pellets 14 such as shown by FIG. 2. The pellets 14 are preferably about 150 to 250 microns in size and consist of encapsulated fluid sealer; the capsules being made in accordance with various patented processes controlled by the National Cash Register Co. and not constituting a portion of this invention.

There are numerous techniques which may be used for coating the bare fasteners with the minute pellets containing fluid. One method which has proven itself to be very satisfactory is to disperse the pellets in a liquid binder, such as lacquer, and then dipping the fasteners into the solution. The rapidly drying lacquer serves as an adhesive to bond the pellets to the surface of the fastener.

A second method, which has also produced satisfactory results, is to apply the liquid binder to the bare fastener, and while the binder is still tacky, the fastener is dipped into a fluidized bed of the pellets.

A third method is to set up a continuously moving production line on which the rivets are set to have upwardly extending shanks; after which the shanks and the adjacent underside of the heads are sprayed with liquid binder and passed through a column of moving pellet laden air.

In addition to using lacquers as a binder, other fluids may be used within the scope of this invention; the only important requirements being that they are chemically inert to the fasteners and to the capsules, and that they have suitable drying and bonding characteristics. Examples of such other fluids are varnishes and resins.

FIG. 4 illustrates the use of the encapsulated rivet, above described, in uniting an outer sheet metal structure 16 to an inner sheet metal structure 18. The pellets 14 of FIG. 2, which were bonded to the rivet of FIG. 3, are now shown on FIG. 4 as a coating 14a. The pellets shown bonded to the rivet in FIG. 3 ruptured under the force involved during the riveting operation, thus releasing the fluid material which flows into all voids in the fayed surfaces. Upon curing or semi-curing, the released liquid will protect the coated surfaces against corrosion. The holes in the sheet metal structures for receiving the rivet are preferably of a size small enough to produce interference when the rivet is driven, in order to rupture the pellets adhering to the shank of the rivet.

An entire fastener may be coated if desired; or, only a portion thereof. For example: on an ordinary threaded cap screw, it may be desired to bond the encapsulated material only on the underneath side of the head and on the unthreaded portion of the shank. The fasteners contemplated are not limited to rivets and cap screws, but may also include bolts and nuts, screws and spring fastening devices. The fluids encapsulated, in addition to the sealants mentioned, may be paint, lubricants, bonding materials, or corrosion inhibiting fluids.

It is to be understood that the embodiments of the present invention as shown and described is to be regarded as illustrative only, and that the invention is susceptible to variations, modifications and changes within the scope of the appended claim.

We claim:

A rivet fastener having a shank and an enlarged head, said shank and the underside of said head having smooth external surfaces, a first coating directly upon substantially the entire external surfaces of said shank and the underside of said head, said first coating being formed from a tacky liquid that dries rapidly, a second coating covering said first coating, said second coating being formed from a plurality of pressure rupturable capsules deposited directly upon said first coating while said first coating is tacky and thereby bonding said capsules to the shank and the underside of said head, said first coating being chemically inert to the material from which said capsules are formed, and a fluid sealant contained within said capsules, said sealant being formed from a fluid that is self-solidifying upon rupture of said capsules to provide a corrosion protective coat of sealant over said first coating upon installation of said fastener, said capsules being on the order of from 150 to 250 microns in size.

References Cited by the Examiner

UNITED STATES PATENTS

| | | | |
|---|---|---|---|
| 771,236 | 10/1904 | Farley | 85—37 |
| 1,976,305 | 10/1934 | Swanson et al. | 85—10.1 |
| 3,061,455 | 10/1962 | Anthony | 151—14.5 |
| 3,179,143 | 4/1965 | Schultz et al. | 151—41.7 |

CARL W. TOMLIN, *Primary Examiner.*

R. S. BRITTS, *Assistant Examiner.*